United States Patent [19]

McEwen et al.

[11] Patent Number: 5,579,643
[45] Date of Patent: Dec. 3, 1996

[54] TURBOCHARGER WITH ANNULAR BYPASS

[75] Inventors: James A. McEwen, Brighouse; John J. Torley, Salendine Nook, both of England

[73] Assignee: Holset Engineering Company, Ltd., Huddersfield, England

[21] Appl. No.: 253,536

[22] Filed: Jun. 3, 1994

[30] Foreign Application Priority Data

Jun. 4, 1993 [GB] United Kingdom ............... 9311584

[51] Int. Cl.⁶ ............................................ F02B 37/18
[52] U.S. Cl. .................................. 60/602; 415/151
[58] Field of Search .......................... 60/602; 415/151

[56] References Cited

FOREIGN PATENT DOCUMENTS

| 34765 | 9/1981 | European Pat. Off. | 60/602 |
| 54-19007 | 2/1979 | Japan | 60/602 |
| 55-25505 | 2/1980 | Japan | 60/602 |
| 58-117322 | 7/1983 | Japan | 60/602 |
| 5-209530 | 8/1993 | Japan | 60/602 |

Primary Examiner—Michael Koczo

[57] ABSTRACT

A turbocharger in which a turbine wheel located in a turbine chamber is driven by an exhaust gas flow. A bypass passageway extends around the chamber to enable exhaust gas to be diverted away from the turbine wheel. A valve is mounted in the bypass passageway and controlled so as to selectively open and close the passageway. The passageway opens into the exhaust gas outlet in a direction such that gas issuing from the passageway is directed in a substantially annular form and in a substantially downstream direction.

10 Claims, 3 Drawing Sheets

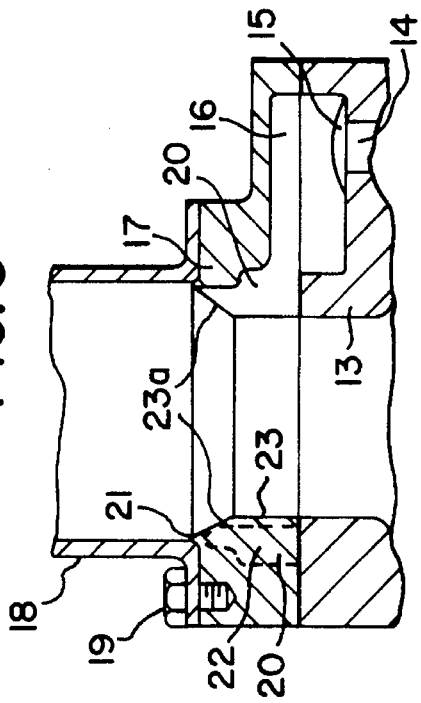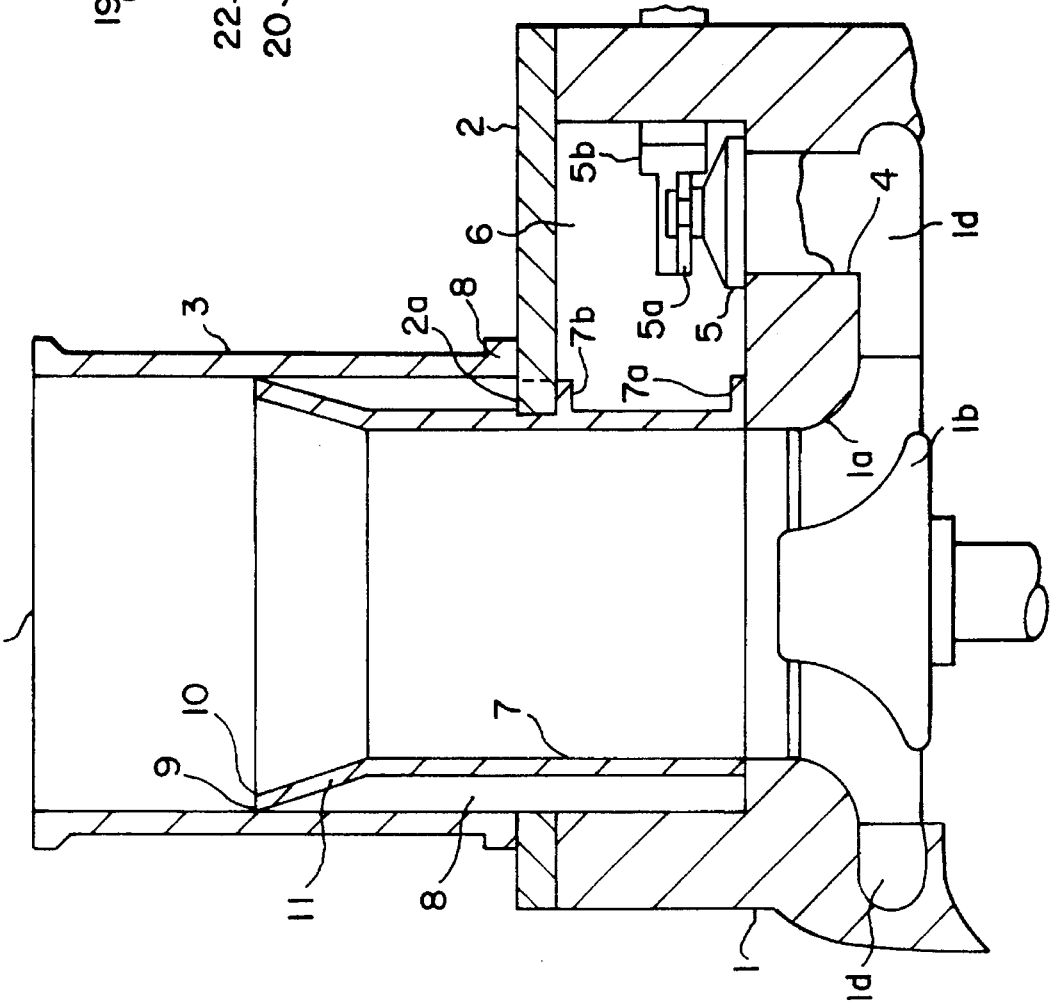

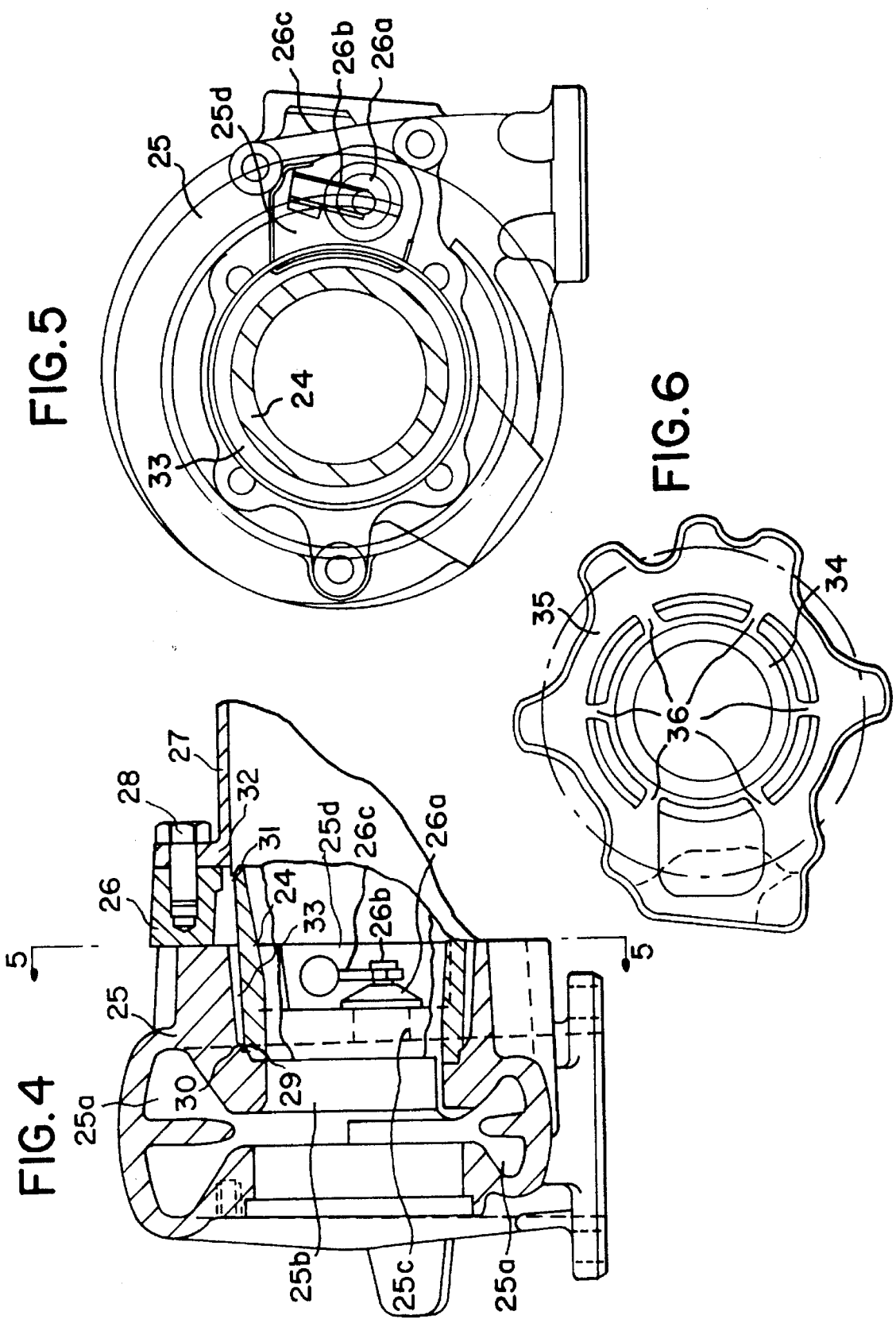

5,579,643

TURBOCHARGER WITH ANNULAR BYPASS

TECHNICAL FIELD

The present invention relates to a turbocharger, and in particular to a turbocharger provided with a bypass passageway through which exhaust gas can be diverted around a turbine wheel.

BACKGROUND ART

Turbochargers are known which comprise a turbine housing defining a turbine chamber, an exhaust gas inlet to the chamber, an exhaust gas outlet from the chamber, and a passageway which extends between the inlet and outlet and bypasses the turbine chamber. A valve is mounted in the passageway and controlled to selectively open and close the bypass passageway. Such arrangements are provided to enable excess exhaust gas to be delivered to the turbocharger outlet thus controlling the speed of a turbine journaled for rotation in the chamber.

In prior art turbochargers, such as those shown in U.S. Pat. Nos. 3,270,951, 4,120,156, and 4,304,097, the bypass passageway opens into a relatively large side pocket which communicates with the turbine outlet. Thus, when exhaust gas flows through the bypass into the pocket it discharges into the exhaust flow generally at right angles to the direction of gas delivered to the outlet from the turbine chamber. This disturbs the flow of gas through the outlet, thereby increasing back pressure and reducing turbine efficiency. Even when the bypass is blocked by the valve, the efficiency of the arrangement is reduced because the relatively large pocket opening into the turbine outlet disturbs the flow of gas.

It is an object of the present invention to obviate or mitigate the problems outlined above.

DISCLOSURE OF THE INVENTION

According to the present invention, there is provided a turbocharger comprising a turbine housing defining a turbine chamber in which a turbine wheel is journaled for rotation, an exhaust gas inlet to the chamber, an exhaust gas outlet from the chamber, a passageway which extends between the inlet and outlet and bypasses the turbine chamber, a valve mounted in the passageway, and means for controlling the valve to selectively open and close the passageway. The passageway opens into the exhaust outlet such that gas issuing from the passageway is directed substantially downstream in the direction in which gas flows through the exhaust outlet from the turbine chamber and is substantially annular in form.

SUMMARY OF THE DRAWINGS

FIG. 1 is a schematic sectional illustration of a first embodiment of the present invention;

FIG. 2 is an outlet end view of a second embodiment of the present invention;

FIG. 3 is a view on the line 3—3 in FIG. 2;

FIG. 4 is a part sectional view of a third embodiment of the present invention;

FIG. 5 is an end view of the arrangement shown in FIG. 4;

FIG. 6 is an inlet end view of a casting from which a component of a fourth embodiment of the present invention is made;

BEST MODE FOR CARRYING OUT THE INVENTION

Figure 8:
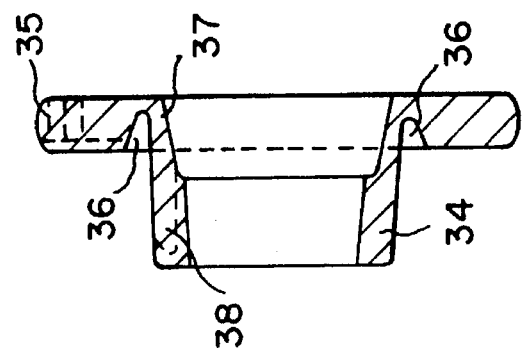
FIGS. 8 and 9 are cross-sections of the casting of FIGS. 6 and 7 on the lines 8—8 and 9—9 of FIG. 7 respectively.
Figure 9:
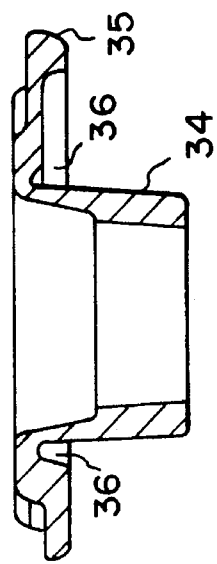
Figure 7:
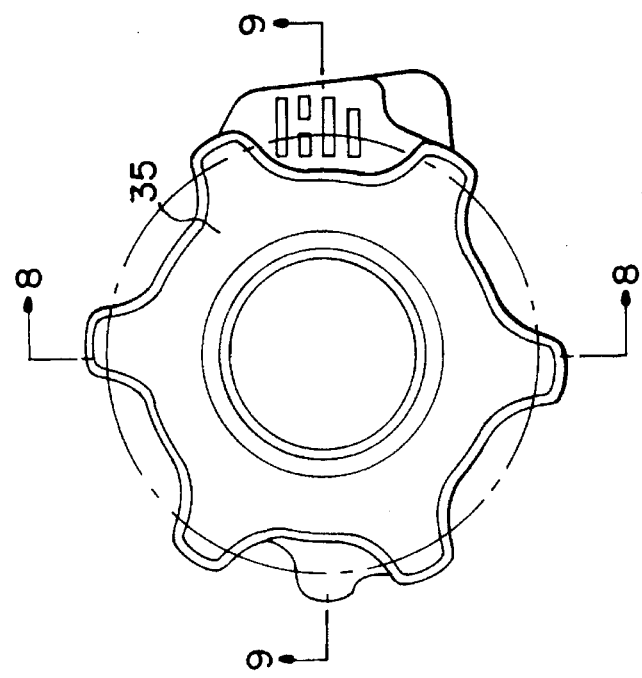
FIG. 7 is an inlet end view of the casting of FIG. 6.

Referring to FIG. 1, the illustrated arrangement comprises a turbine housing including a casing 1 only the downstream portion of which is shown, a cover plate 2, and an exhaust outlet 3 suitably attached to cover 2. The casing 1 defines a turbine chamber 1a in which a turbine wheel 1b is rotatably supported by a suitable bearing system (not shown). Exhaust gas is fed from an exhaust inlet 1d through the turbine chamber 1a and over the turbine wheel so as to cause it to rotate. The exhaust gas continues from the turbine chamber into the exhaust outlet 3.

The casing 1 defines an upstream portion 4 of a bypass passageway, that portion being blocked by a poppet valve 5 located inside a chamber 6. A crank arm 5a is fastened to valve 5 and extends to a shaft 5b pivotable to block and open upstream portion 4 of the bypass passageway. A tube like insert 7 is mounted within the exhaust outlet 3 by tabs 7a, 7b which are fastened to casing 1 and projection 2a, respectively so as to define with that outlet an annular chamber 8. Chamber 8 communicates with the chamber 6 such that gas flowing into chamber 6 is distributed to the annular chamber 8 and issues into the exhaust outlet 3 through an annular gap 9 defined between a downstream edge 10 of the insert 7. An outwardly tapering portion 11 of the insert 7 provides a relatively smooth transition from the upstream portion of the insert 7 which is of relatively small diameter and the downstream edge 10 of the insert 7 which is of relatively larger diameter.

It will be appreciated that when the poppet valve 5 is shut, no gas can issue into the exhaust outlet 3 through the annular gap 9. The tapering portion 11 of the insert 7 ensures, however, that relatively little turbulence is induced in the gas-flow passing the gap 9. When the valve 5 is open, gas passing through the insert 7 from the turbine chamber 1d travels generally parallel to the axis 12 of the exhaust outlet 3 and gas issuing into the exhaust outlet 3 through the annular gap 9 also travels generally parallel to the axis 12. Thus there is little disturbance to the flow of gas and operating efficiency is therefore maximized.

Tests with the structure illustrated in FIG. 1 have shown that the cross-sectional flow area of the gap 9 is preferably between 1½ times and 2 times the cross-sectional flow area of the upstream portion 4 of the bypass passageway.

Referring now to the second embodiment of the invention illustrated in FIGS. 2 and 3, a casing 13 houses a turbine wheel (not shown) and defines an upstream portion 14 of a bypass passageway. A poppet valve 15 closes the downstream end of the passageway portion 14 and is actuated in a manner like the poppet valve 5 of FIG. 1 with a crank arm and pivotable shaft (both not shown). When the valve 15 is open, gas within the passageway 14 enters a chamber 16 defined between the casing 13 and a cast cover plate 17. An exhaust outlet 18 is secured to the cover plate 17 by screws 19.

The cover plate 17 is formed as a casting and defines an annular portion 20 of the bypass passageway, the annular portion reducing in radial width towards a substantially annular slot 21 through which gas issues into the exhaust outlet 18. Radially extending struts 22 support a radially inner wall 23 of the cover plate 17, the radially inner wall 23 defining an upstream portion of the exhaust outlet 18. The surface 23 diverges at 23a outwards towards the upstream portion of the exhaust outlet 18 into which the gas issues from the substantially annular slot 21.

In order to manufacture the cover plate 17 shown in FIGS. 2 and 3, it can be formed by casting without the provision of the slot 21. The annular slot 21 may then be formed by rotating the casting about the centerline of the radially inner wall 23 and making an annular lathe cut, metal being removed until the slot being cut breaks through and connects to the annular chamber 20 to form a substantially annular slot 21 with supporting struts 22 positioned around its circumference.

Thus the structure of FIGS. 2 and 3 is similar to that of FIG. 1 in terms of the way in which exhaust gases are directed through the main outlet from the turbine chamber and from the bypass passageway. Gas issuing from the substantially annular slot 21 is directed generally parallel to the axis of the tubular outlet 18 in a downstream direction and thus does not significantly disrupt the flow of gas from the turbine.

Referring now to FIGS. 4 and 5, these illustrate a third embodiment of the invention in which a turbine casing 25 forms an exhaust gas inlet 25a for a turbine chamber 25b in which a turbine wheel (not shown) is journaled for rotation. A bypass passageway 25c extends from the exhaust gas inlet 25a to a chamber 25d in which a poppet valve 26a is positioned to block or permit flow through bypass passageway 25c. A crank arm 26b extends to a pivotable shaft 26c for selective movement of poppet valve 26a. A tubular insert 24 is clamped between the casing 25 and a cast cover plate 26 so that chamber 25d connects with the outer wall of tubular insert 24. An exhaust outlet 27 is secured to the cover plate 26 by screws 28. The tubular insert 24 is formed at its inner end with an annular shoulder 29 which abuts against a corresponding annular shoulder 30 provided by the casing 25, and at its outer end with 6 equi-spaced radially extending webs 31 (only one of which is shown) which abut against a radial shoulder 32 formed in the cover plate 26. Gaskets (not shown) may be located between the insert 24 and the casing 25 and cover plate 26 to ensure the insert 24 is tightly held between the two.

An annular portion 33 of a bypass channel connecting to chamber 25d is defined between the tubular insert 24 and both the casing 25 and cover plate 26. When the bypass channel 33 is open through operation of valve 26a, exhaust gas issues into the exhaust outlet 27 through the annular portion 32 and between the webs 31.

FIGS. 6 through 9 illustrate a cast member which is used to fabricate a component of a fourth embodiment of the invention which is a modification of that shown in FIGS. 4 and 5 by integrating the tubular element 24 and cover plate 26. The unitary cast member illustrated comprises a tubular portion 34 and an annular flange portion 35 and replaces the separate tubular insert 24 and cover plate 26 described above. The tubular portion 34 and annular portion 35 are joined together by 6 webs 36.

Subsequent to casting, the cast member is machined as shown partially by the dotted lines in FIG. 8 to give the finished component. In particular the casting is rotated and a cut, indicated by reference 37, is made to open up an annular slot between the webs 36 to communicate the bypass channel (not shown) with the exhaust outlet (not shown). Also, the end of the tubular portion 34 is machined as shown by the dotted line 38 to provide an annular shoulder for location in the turbine housing casing (not shown).

The embodiments of FIGS. 4 to 9 described above function in a similar manner to the previously described embodiments of the invention in the way that exhaust gases are directed through the main outlet from the turbine chamber and from the bypass passageway. In particular, downstream portions of both the tubular insert 24 and the tubular portion 34 taper radially outwards to provide a relatively smooth transition for exhaust gas exiting the turbine and entering the exhaust outlet. In both cases gas issuing from the respective bypass channels is directed generally parallel to the axis of the exhaust outlet to minimize disruption in the flow of gas from the turbine.

Having thus described the invention, what is claimed as novel and desired to be secured by letters patent of the United States is:

1. An exhaust gas turbocharger comprising:

a turbine housing having a turbine chamber, an exhaust gas inlet to said chamber and an exhaust gas outlet from said chamber, a turbine wheel journaled for rotation in said turbine chamber and responsive to exhaust gas flow from said exhaust gas inlet across said turbine wheel to said exhaust gas outlet for causing it to rotate in response to the flow of exhaust gases, means for defining a bypass flow path from said exhaust gas inlet to said exhaust gas outlet in parallel flow relation to said exhaust gas flow path across said turbine, said bypass flow path means defining a substantially annular outlet into said exhaust gas outlet in a substantially downstream direction generally parallel to the axis of rotation of said turbine wheel, said bypass flow path means comprising a tubular wall insert extending from said turbine chamber into said exhaust gas outlet and spaced radially inward from the walls thereof to form said substantially annular outlet, said tubular wall insert having a downstream portion which diverges radially outward toward the walls of said exhaust gas outlet and said turbine housing having a bypass chamber extending from the outer wall of said tubular wall insert and a passageway extending from said bypass chamber to said exhaust gas inlet and a valve positioned to selectively block or permit flow through said passageway.

2. A turbocharger as in claim 1 wherein said valve is a poppet valve and said turbocharger further comprises means supporting said poppet valve for movement against and away from said passageway to selectively block and permit bypass flow.

3. A turbocharger as in claim 2 wherein said poppet valve supporting means comprises a shaft journaled in said turbine housing for pivoting movement and a crank arm, one end of which is fixed to said shaft and the other end of which is fixed to said poppet valve so that pivoting movement of said shaft moves said poppet valve against and away from said passageway.

4. A turbocharger as in claim 1 wherein the flow area of said substantially annular outlet is between approximately one and one half and two times the flow area of said passageway.

5. An exhaust gas turbocharger comprising:

a turbine housing having a turbine chamber, an exhaust gas inlet to said chamber and an exhaust gas outlet from said chamber, a turbine wheel journaled for rotation in said turbine chamber and responsive to exhaust gas flow from said exhaust gas inlet across said turbine wheel to said exhaust gas outlet for causing it to rotate in response to the flow of exhaust gas, means for defining a bypass flow path from said exhaust gas inlet to said exhaust gas outlet in parallel flow relation to said exhaust gas flow path across said turbine, said bypass flow path means being defined in part by a flow path from said exhaust gas inlet to a chamber adjacent said exhaust gas outlet said by pass flow path means comprising:

a cover plate secured to said turbine housing and adjacent said exhaust gas outlet and over said chamber, said cover plate having a central passage connecting said turbine chamber with said exhaust gas outlet and an annular passage spaced radially outward from said central passage and extending from said chamber to said exhaust gas outlet defining a substantially annular outlet into said exhaust gas outlet in a substantially downstream direction, and a valve for selectively blocking and permitting flow through said bypass flow path.

6. A turbocharger as in claim 5 wherein said cover plate has a plurality of struts bridging said annular passage at the downstream end thereof.

7. A turbocharger as in claim 6 wherein said central passage has a diverging flow area adjacent the downstream end thereof.

8. An exhaust gas turbocharger comprising:

a turbine housing, having a turbine chamber, an exhaust gas inlet to said chamber and an exhaust gas outlet from said chamber, a turbine wheel journaled for rotation in said turbine chamber and responsive to the exhaust gas flow path from said exhaust gas inlet across said turbine wheel to said exhaust gas outlet for causing it to rotate in response to the flow of exhaust gases, means for defining a bypass flow path from said exhaust gas inlet to said exhaust gas outlet in parallel flow relation to said exhaust gas flow path across said turbine, said bypass flow path means being defined in part by a flowpath from said exhaust gas inlet to a chamber adjacent said exhaust gas outlet said bypass, flow path means comprising;

a cover plate secured to said turbine housing adjacent said exhaust gas outlet and over said chamber, a central tubular element mounted and sandwiched between said turbine housing and said cover plate, said central tubular element having an inner wall forming a central passage connecting said turbine chamber with said exhaust gas outlet and an outer wall forming, in combination with said cover plate and turbine housing, an annular passage spaced radially outward from said central passage and extending from said chamber to said exhaust gas outlet defining a substantially annular outlet into said exhaust gas outlet in a substantially downstream direction, and a valve for selectively blocking and permitting flow through said bypass flow path.

9. A turbocharger as in claim 8 wherein said tubular element has a plurality of struts at the downstream end thereof.

10. A turbocharger as in claim 9 wherein said central passage has a diverging flow area adjacent the downstream end thereof.

\* \* \* \* \*